(12) United States Patent
Shian et al.

(10) Patent No.: US 10,895,736 B2
(45) Date of Patent: Jan. 19, 2021

(54) METHODS AND APPARATUS FOR MODULATING LIGHT USING A DEFORMABLE SOFT DIELECTRIC

(71) Applicant: President and Fellows of Harvard College, Cambridge, MA (US)

(72) Inventors: Samuel Shian, Arlington, MA (US); David Clarke, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 79 days.

(21) Appl. No.: 15/758,017

(22) PCT Filed: Sep. 14, 2016

(86) PCT No.: PCT/US2016/051589
§ 371 (c)(1),
(2) Date: Mar. 7, 2018

(87) PCT Pub. No.: WO2017/048754
PCT Pub. Date: Mar. 23, 2017

(65) Prior Publication Data
US 2018/0246318 A1    Aug. 30, 2018

Related U.S. Application Data

(60) Provisional application No. 62/218,506, filed on Sep. 14, 2015.

(51) Int. Cl.
*G02B 26/00* (2006.01)
*G02B 26/02* (2006.01)
(Continued)

(52) U.S. Cl.
CPC ............ *G02B 26/02* (2013.01); *E06B 9/24* (2013.01); *G02B 26/06* (2013.01); *G02B 26/08* (2013.01); *E06B 2009/2464* (2013.01)

(58) Field of Classification Search
CPC ........ G02F 2203/12; G02F 1/21; G02F 1/055; G02F 1/19; G02F 1/1334;
(Continued)

(56) References Cited

U.S. PATENT DOCUMENTS

2005/0157893 A1    7/2005 Pelrine et al.
2007/0074316 A1*   3/2007 Alden .................... B82Y 30/00
                                                257/784
(Continued)

FOREIGN PATENT DOCUMENTS

WO    WO 2013/093766 A1    6/2013
WO    WO 2014/169119 A1    10/2014

OTHER PUBLICATIONS

International Search Report and Written Opinion for Application No. PCT/US2016/051589 dated Nov. 18, 2016.
(Continued)

*Primary Examiner* — Brandi N Thomas
(74) *Attorney, Agent, or Firm* — Wolf, Greenfield & Sacks, P.C.

(57) ABSTRACT

Methods and apparatus for modulating light thorough a transparent laminate structure. The transparent laminate structure includes at least one soft dielectric layer and at least one stiff dielectric layer having a stiffness greater than the stiffness of the at least one soft dielectric layer. The transparent laminate structure further comprises a plurality of stiff conductive elements formed on a surface of the at least one soft dielectric layer that, in the presence of an electric field, compress the at least one soft dielectric layer to alter a morphology of the surface of the at least one soft dielectric layer on which the plurality of stiff conductive elements are formed. Light incident on the surface of the at least one soft dielectric layer is scattered by the undulating
(Continued)

morphology of the surface, thereby reducing the transmission of light through the transparent laminate structure.

15 Claims, 15 Drawing Sheets

(51) Int. Cl.
*G02B 26/06* (2006.01)
*G02B 26/08* (2006.01)
*E06B 9/24* (2006.01)

(58) Field of Classification Search
CPC .... G02F 1/133512; G02F 1/167; G02F 1/172; G02F 1/0147; G02F 1/015; G02F 1/133526; G02F 1/134309; G02F 1/13439; G02F 1/13718; G02F 2201/121; G02F 2201/123; G02F 2202/36; G02F 2203/01; G02F 2203/02; G02F 2203/04; G02F 2203/50; G02F 1/025; G02F 1/09; G02F 1/091; G02F 1/132; G02F 1/133345; G02F 1/135; G02F 1/139; G02F 2001/1678; G02F 2203/10; G02B 26/0816; G02B 30/26; G02B 26/08; G02B 26/02; G02B 26/0808; G02B 26/005; G02B 27/28; G02B 5/008; G02B 5/3058; G02B 26/001; G02B 26/06; G02B 26/0825; G02B 26/0841; G02B 27/48; G02B 5/0825

USPC ........ 359/237, 242, 265–267, 290–292, 295, 359/298

See application file for complete search history.

(56) References Cited

U.S. PATENT DOCUMENTS

| | | |
|---|---|---|
| 2007/0158697 A1 | 7/2007 | Choi et al. |
| 2012/0128960 A1 | 5/2012 | Busgen et al. |
| 2012/0262778 A1* | 10/2012 | Hashimura ............... G02F 1/19 359/296 |
| 2013/0155484 A1 | 6/2013 | Sweatlock et al. |
| 2015/0043079 A1 | 2/2015 | Park et al. |

OTHER PUBLICATIONS

International Preliminary Report on Patentability for Application No. PCT/US2016/051589 dated Mar. 29, 2018.
Extended European Search Report for Application No. EP 16847163.9 dated Aug. 2, 2019.
Van Den Ende et al., Voltage-Controlled Surface Wrinkling of Elastomeric Coatings. Advanced Materials. 2013;25(25):3438-42. doi: 10.1002/adma.201300459.

\* cited by examiner

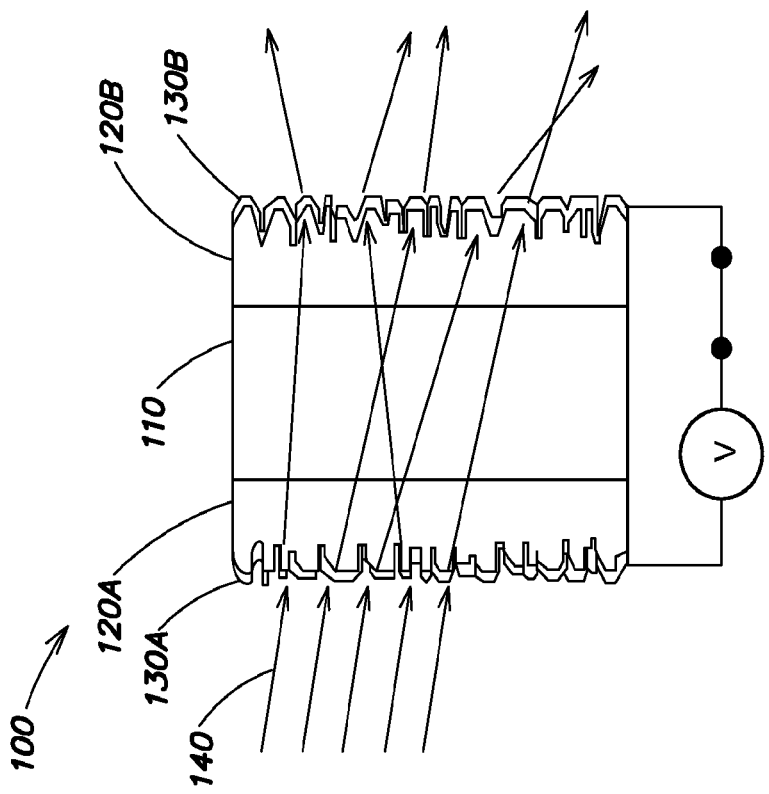
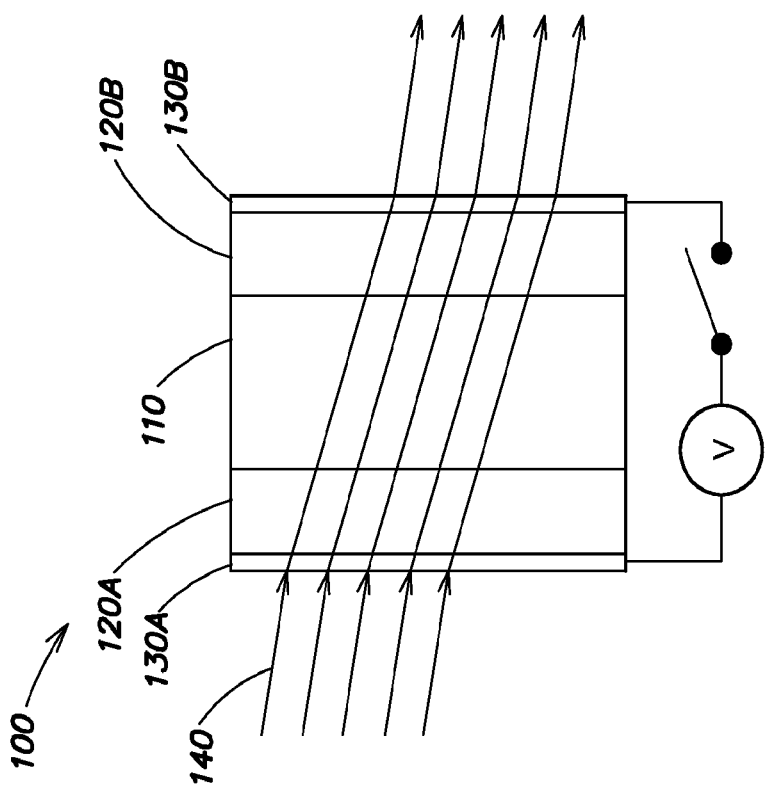

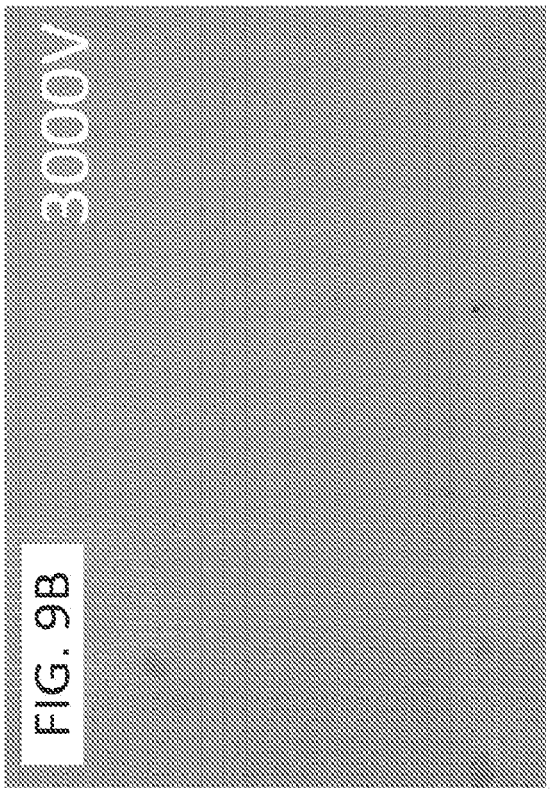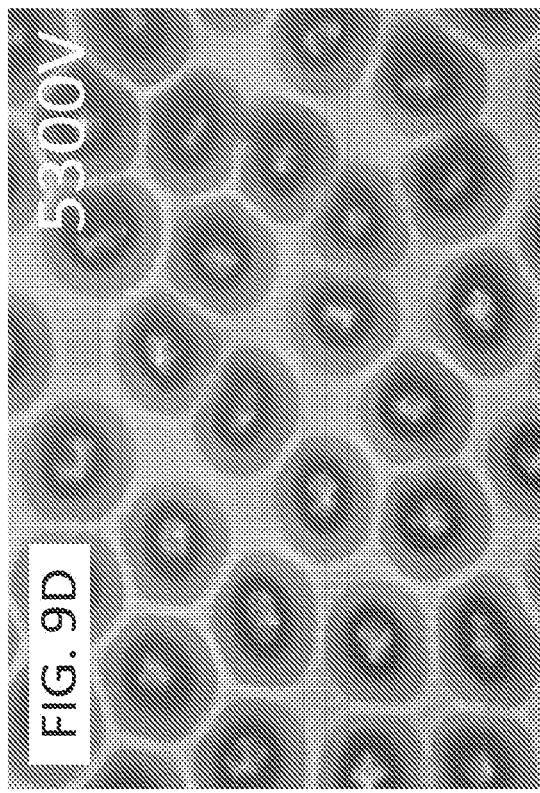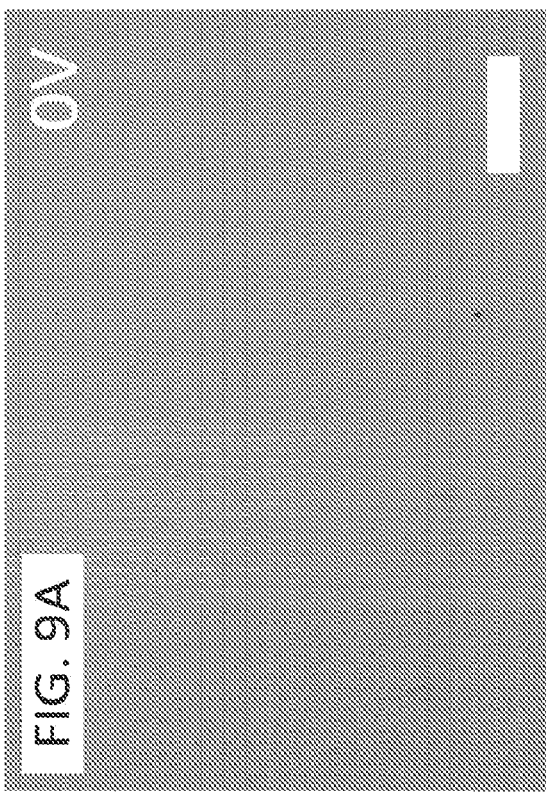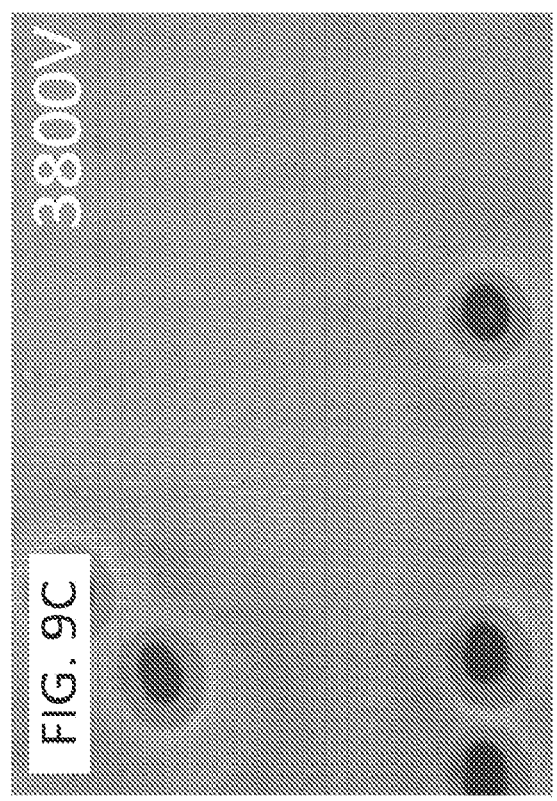

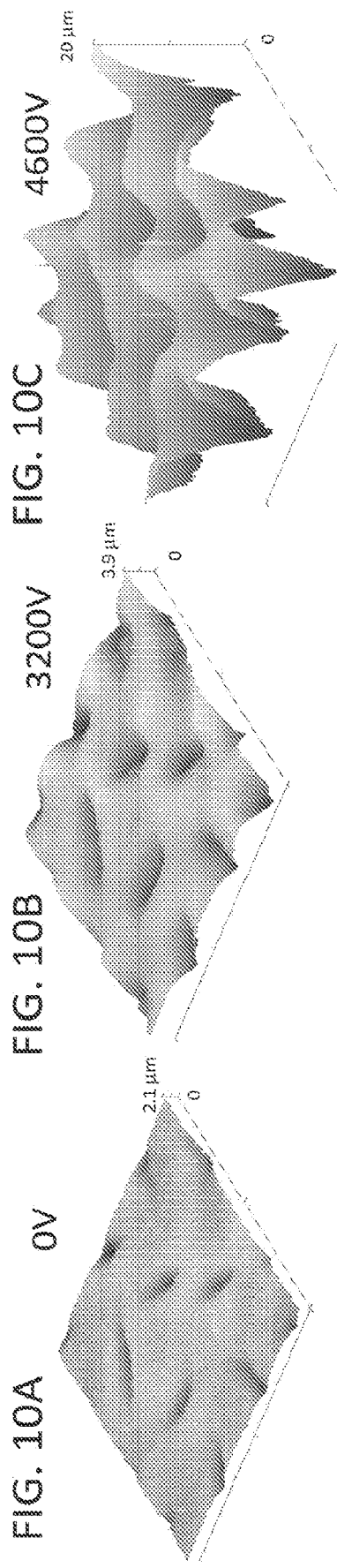
FIG. 10A  0V
FIG. 10B  3200V
FIG. 10C  4600V
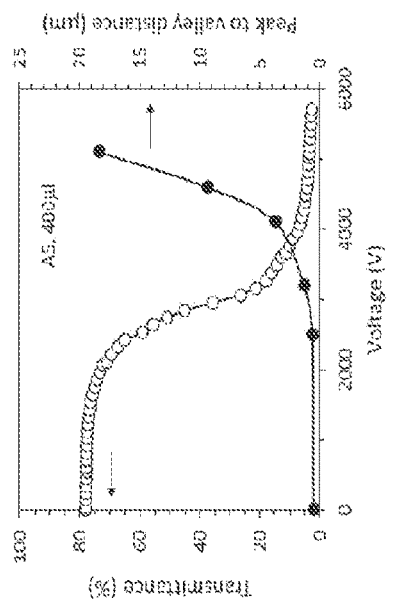
FIG. 10E
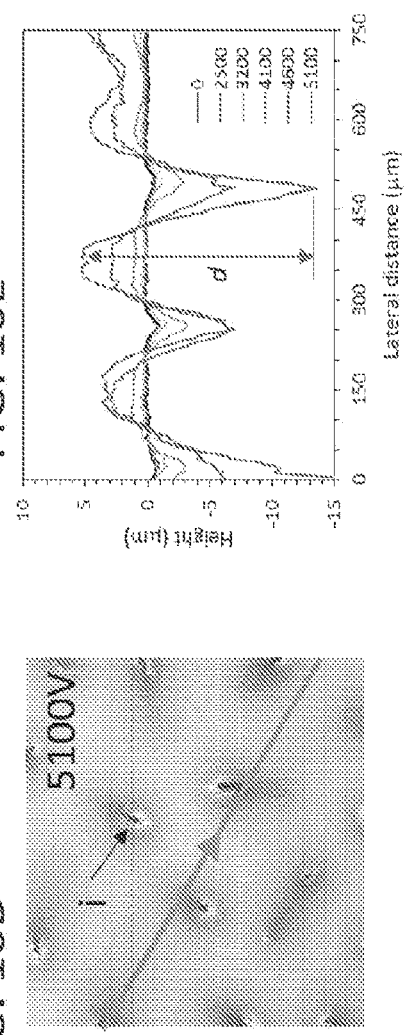
FIG. 10D  5100V
FIG. 10F

METHODS AND APPARATUS FOR MODULATING LIGHT USING A DEFORMABLE SOFT DIELECTRIC

RELATED APPLICATIONS

This Application is a national stage filing under 35 U.S.C. § 371 of International Application No. PCT/US2016/051589, filed Sep. 14, 2016, entitled "METHODS AND APPARATUS FOR MODULATING LIGHT USING A DEFORMABLE SOFT DIELECTRIC," which claims priority to U.S. Provisional Application No. 62/218,506, filed Sep. 14, 2015, entitled "METHODS AND APPARATUS FOR MODULATING LIGHT USING A DEFORMABLE SOFT DIELECTRIC," each of which is incorporated by reference in its entirety.

BACKGROUND

Electrically-activated light modulation devices operate to change the transmittance of light through the device in response to an applied electric field or voltage. The use of light modulation devices in consumer and commercial products allows a user to control a level of transparency or dimming through the product via a user interface. For example, smart windows may incorporate a light modulation device that provides clarity though the window at the touch of a button. Other applications of light modulation devices include incorporation in privacy screens for conference rooms and use in camouflage.

SUMMARY

According to one aspect of the technology described herein, a light modulation device is described. The light modulation device includes a transparent laminate structure including at least one soft dielectric layer and at least one stiff dielectric layer having a stiffness greater than the stiffness of the at least one soft dielectric layer. The light modulation device further includes a plurality of stiff conductive elements formed on a surface of the at least one soft dielectric layer that, in the presence of an electric field, compress the at least one soft dielectric layer to alter a morphology of the surface of the at least one soft dielectric layer on which the plurality of stiff conductive elements are formed.

According to another aspect, a method of modulating light is described. The method comprises providing a transparent laminate structure including at least one soft dielectric layer and at least one stiff dielectric layer having a stiffness greater than the stiffness of the at least one soft dielectric layers, providing a first set of stiff conductive elements on a surface of the at least one soft dielectric layer, and applying a voltage between the first set of stiff conductive elements and an electrode to generate an electric field, wherein the electric field compresses the first set of stiff conductive elements into the surface of at least one soft dielectric layer to alter a morphology of the surface of the at least one soft dielectric layer, wherein the altered morphology of the surface of the at least one soft dielectric layer is configured to scatter light incident on the transparent laminate structure.

According to another aspect, a dielectric film is described. The dielectric film comprises a soft dielectric substrate having a mesh of conductive elements formed on a surface of the soft dielectric substrate, wherein the mesh of conductive elements is configured to compress the surface of soft dielectric substrate in the presence of an electric field to alter a morphology of the surface of the soft dielectric substrate.

According to another aspect, a light modulation device is described. The light modulation device comprises a transparent laminate structure including at least one soft layer and at least one stiff layer having a stiffness greater than the stiffness of the at least one soft layer and a plurality of stiff conductive elements formed on a surface of the at least one soft layer that, in the presence of an electric field, compress the at least one soft layer to alter a morphology of the surface of the at least one soft layer on which the plurality of stiff conductive elements are formed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

FIG. 1A illustrates a schematic of a light modulation device, in accordance with some embodiments, in the absence of a voltage across the device;

FIG. 1B illustrates a schematic of the light modulation device shown in FIG. 1A when a voltage is applied across the device;

FIGS. 9A-9D illustrate optical microscope images showing changes in elastomer surface morphology of the light modulation device shown in FIG. 3A for different applied voltages;

FIGS. 10A-10D illustrate confocal microscopy images showing changes in elastomer surface morphology of the light modulation device shown in FIG. 3A for different applied voltages;

FIG. 10E illustrates a plot of surface height taken along the line shown in FIG. 10D at different applied voltages;

FIG. 10F illustrates a plot showing the peak-to-valley depth and optical transmittance as a function of applied voltage;

DETAILED DESCRIPTION

Figure 1C:
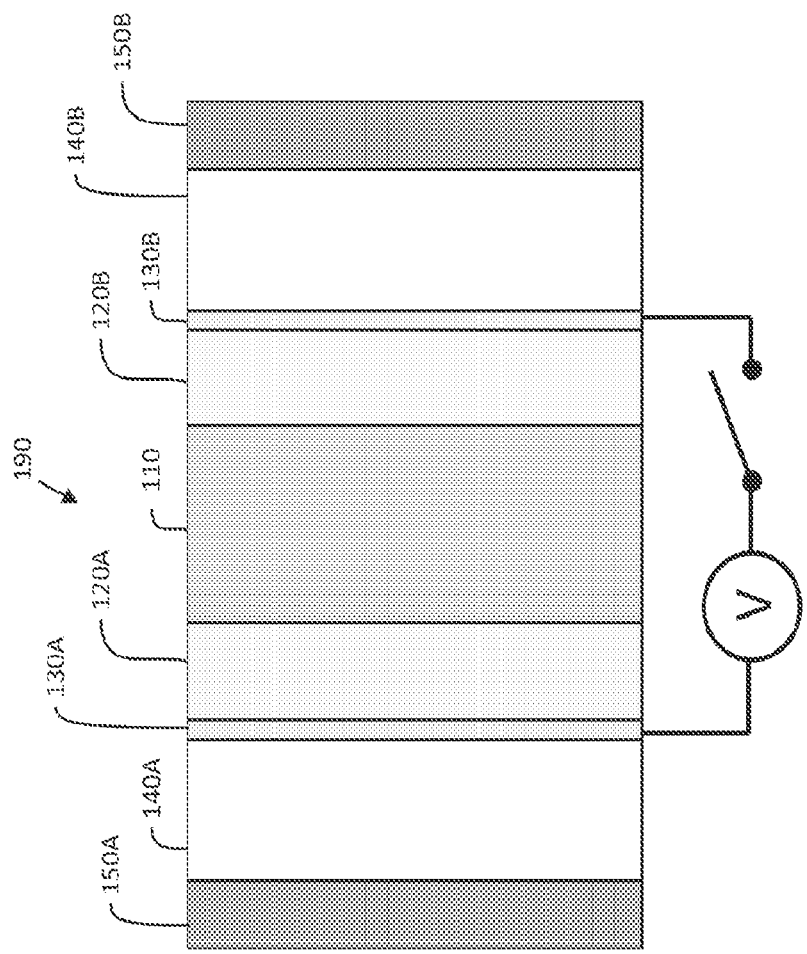
FIG. 1C illustrates a schematic of an alternate light modulation device, in accordance with some embodiments, in the absence of voltage across the device.

The inventors have recognized and appreciated that the transmittance of light through a transparent substrate (e.g., glass) may be altered using a light modulation device that includes a mesh of stiff conductive elements (e.g., a percolating mesh of nanowires) formed on the surface of a soft (e.g., flexible) dielectric. For example, upon application of an electric field to the stiff conductive elements, the stiff conductive elements compress the soft dielectric substrate, creating undulations in the surface of the soft dielectric substrate. The undulations in the surface of the substrate scatter light incident on the substrate to reduce transmittance of the light through the substrate, as discussed in further detail below.

Some conventional techniques for altering the transmittance of light through a substrate include electrochromic, liquid crystal, suspended particle, and micro-blind techniques, each of which is described in more detail below.

Electrochromic light modulation devices arrange layers of electrodes and active materials between two glass panes. The composition of active materials includes cationic transition metals and anionic species. When a voltage is applied to the electrodes, electrical current flows, and an electrochemical reaction changes the oxidation states of the active materials. Since the oxidation states of the active materials have different optical properties (e.g., opacity), changes in the applied electrical current results in changes in the optical transmittance of the active materials from transparent to opaque or vice versa. In some implementations of electrochromic technology, transition-metal hydride is used to enable an optical transition from a transparent state to a reflective state rather than to an absorptive state in response to changes in the applied electric current.

Polymer dispersed liquid crystal (PDLC) technology involves arranging droplets of liquid crystals suspended in a polymer matrix between two electrode polymer films. The droplets are typically formed by a dissolution process during cooling of a homogenous solution of the polymer mixture, followed by curing to freeze the droplets in the polymer matrix. In the absence of an electric field, the liquid crystals within the droplets are randomly oriented, thereby scattering incoming light. When an electric field is applied, the crystals align to the direction of the applied electric field reducing light scatter and resulting in increased transparency through the device.

Suspended particle devices (SPDs) operate in a similar manner to PDLC devices, but use anisotropic particles, such as rods suspended in a fluid layer, rather than liquid crystal droplets suspended in a polymer matrix, as discussed above. The application of an AC electric field changes the orientation of the suspended particles from a random orientation to an orientation aligned with the applied electric field, thereby reducing the light scattering effect of the particles.

Micro-blind technology involves micro-fabricating metal blinds on a glass substrate. In the absence of an applied voltage, the micro-blinds are rolled to allow light pass through. Upon application of voltage, electrostatic forces unroll the micro-blinds and consequently block the transmitted light. The micro-blind structures are typically deposited using magnetron sputtering followed by laser patterning and lithography.

Other conventional techniques for electrically controlling light transmittance are through a stretchable substrate that mechanically changes the surface morphology upon actuation. Such techniques typically require dead space for actuation strain and have a small contrast ratio, as discussed in further detail below. In some dielectric elastomer actuator configurations, a stiff dielectric layer is absent and the force (also referred to Maxwell stress) applied to the electrodes produces lateral expansion of the elastomer. Because of volume conservation, such lateral expansion decreases the thickness of both the soft dielectric and the electrodes formed thereon. In combination with the right electrode, this mode of actuation has been shown to alter the light transmittance of the device. For example, both carbon particle electrodes and copper nanowires have been shown to become more optically transparent upon actuation than that in the initial state. Another variation of electrode is using pre-compressed electrodes, such as graphene, that form surface crumpling at zero voltage and become smooth upon stretching by a voltage actuation. However, this mode of actuation has a drawback of requiring significant extra space for the lateral strain. Areal strain of at least 50% to 100% is typically required to induce significant changes in the light transmission through the device. Moreover, a rigid frame around the dielectric is also required to keep the soft dielectric in a tensioned state.

The wrinkling instability on the surface of soft dielectrics has been demonstrated to alter light transmission or reflectivity. For instance, gold-sputtered electrodes on a soft silicone substrate has been used to create a device that scatters light upon the formation of wrinkling. This method eliminates the need for lateral expansion, however it requires a threshold voltage before the wrinkling instability occurs. Although the periodicity of the wrinkling can be directly adjusted using voltage and indirectly controlled through choice of the thickness of the dielectric/electrode, the wrinkly pattern remains the same and is usually sinusoidal. The lack of sharp curvatures in the sinusoidal wrinkling pattern limit the slight scattering ability of such structures. As a result, the reported contrast ratio between voltage off and on is typically quite small, for example, typically only a 11% change in light transmission in the on versus off state is observed.

Some embodiments are directed to an electrically-activated light modulation device that combines a plurality of stiff conductive elements (e.g., a sheet of randomly-arranged electrically percolating nanowires or carbon nanotubes) with a soft dielectric substrate. The stiff conductive elements may be either randomly or regularly patterned, as discussed in more detail below. Embodiments may be used for a wide variety of applications including, but not limited to, smart windows, privacy windows (e.g., for meeting rooms, hospitals, fitting rooms, bathrooms/showers), and temporary projection screens. Some embodiments are configured to mechanically deform the surface of the soft dielectric substrate to create bulges between the stiff conductive elements formed on the surface of the substrate in response to an applied electric field. As discussed in further detail below, the inhomogeneous deformation of the soft dielectric substrate surface induced by the electric field when the stiff conductive elements are spatially inhomogeneous is used to introduce a random scattering of light over the surface, thereby limiting the optical transmittance of the device.

Electrically-responsive dielectric elastomer actuators are capable of large actuation strains and possess high energy densities, comparable to natural muscle. Under typical configurations, conformal electrodes are applied on both sides of an elastomer sheet or membrane and when an electrical field is applied across the electrodes, both the electrodes and the membrane expand laterally together. Very large reversible lateral strains, up to several hundred percent have been reported, depending on the dielectric elastomer materials and loading configuration. The inventors have recognized and appreciated that using stiff electrodes (e.g., metal nanowires) that incompletely cover the surface of the elastomer produces non-uniform surface deformation when an electric field is applied. The surface non-uniformity may be exploited to control the propagation of light passing through the device. Moreover, by reducing or preventing the lateral expansion of the elastomer, the surface displacements and hence attainable surface roughness can be increased. Reducing lateral expansion of the elastomer may be achieved by attaching the elastomer to a stiff substrate (e.g., glass) or a plastic or other material stiffer than the elastomer but still flexible enough such that the device remains bendable or is able to conform to simple shapes.

For randomly-oriented stiff electrodes, meshes of metallic nanowires or nanotubes may be used to transform a transparent laminate into a highly scattering laminate that can be used for a variety of applications including, but not limited to, smart windows and privacy windows. When an electric field is applied, the compressive Maxwell stress on the electrodes presses into the soft elastomer, creating local depressions and bulges that alter the surface morphology by making it appear rough. When a transparent elastomer is used, the electric field induced surface undulations modifies the passage of light entering or passing through the device. Applying a stronger electric field to the device increases the roughness of the surface morphology to further alter light propagation though the device.

FIG. 1A schematically illustrates a light modulation device 100 in accordance with some embodiments. As shown, light modulation device 100 includes a three-layer laminate transparent dielectric structure including a stiff dielectric layer 110 coupled to a first soft dielectric layer 120A and a second soft dielectric layer 120B. Stiff dielectric layer 110 may comprise any material or materials such that stiff dielectric layer 110 has a stiffness capable of providing lateral constraint to the soft dielectric layers 120A, 120B during actuation. For example, stiff dielectric layer 110 may comprise, glass, plastic, or any other suitable material(s) stiffer than the material(s) used to form soft dielectric layers 120A, 120B. Stiff dielectric layer 110 may be coupled to the soft dielectric layers 120A, 120B in any suitable way. For example, in some embodiments, stiff dielectric layer 110 is laminated between the two soft dielectric layers. Soft dielectric layers 120A, 120B may include any suitable transparent elastomer material(s). For example, a wide variety of commercially available transparent elastomers, such as silicones, polyacrylates, and polyurethanes, may be used.

Light modulation device 100 also includes a plurality of conductive elements 130A, 130B formed on the surface of the soft dielectric layers 120A, 120B respectively. In some embodiments, conductive elements 130A and 130B comprise a network or mesh of randomly-oriented conductive nanowires (e.g., silver nanowires), carbon nanotubes, or a combination of conductive nanowires and carbon nanotubes, is formed on the surface of soft dielectric layers 120A, 120B, respectively. The density of conductive elements formed on the surface may be controlled to optimize transparency while maintaining electrical conductivity. Due to the constraint of the stiff dielectric, the network of conductive elements may be configured to deform the soft elastomer primarily in the thickness direction and to have negligible displacement in the lateral direction.

As shown in FIG. 1A, in the absence of a voltage applied across the pair of conductive elements 130A, 130B, light 140 entering the device is specularly transmitted though the device. FIG. 1B schematically illustrates light modulation device 100, when a voltage is applied across the pair of conductive elements 130A, 130B. As shown, when the voltage is applied across the conductive elements 130A, 130B, the surface morphology of the soft dielectric layers 120A, 120B changes, resulting in deformations in the surface of the soft dielectric layers due to compression of the stiff conductive elements 130A, 130B into the soft dielectric layers in response to the applied electric field. As shown, incident light 140 interacts with the rough surface morphology of the soft dielectric layers 120A, 120B to scatter the light in multiple different directions. Since the conductive elements are randomly oriented, the resulting deformation creates irregular scattering, diffusing the light as it passes through the device.

One aspect of the light modulation device design shown in FIGS. 1A and 1B is that the soft dielectric layers 120A, 120B and their associated conductive elements 130A, 130B can be manufactured as a film that can be applied to existing stiff substrates 110, such as panes of glass. Accordingly, some embodiments may be retrofitted onto any transparent stiff substrate where changing the transmittance through the substrate is desired. Applying such a film to each side of the transparent substrate and providing an appropriate voltage that yields a suitable amount of compression to control light transmission through the substrate may be all that is required to convert any transparent surface into a dimmable surface. A dielectric film designed in accordance with the techniques described herein may be applied to any stiff substrates 110 examples of which include, but are not limited to, windows, LCD screens, vehicle windshields, and solar cells. In addition to providing tunable dimming, some embodiments may also provide thermal regulation (e.g., for smart windows). Such embodiments may be integrated with one or more sensors to adjust the transmission of light through the device to provide a desired amount of thermal regulation.

The inventors have recognized and appreciated that arranging the conductive elements 130A, 130B on the outside surface of the device, as shown in FIGS. 1A and 1B, may result in the conductive elements being susceptible to damage through wear and abrasion. FIG. 1C illustrates an alternate design of a light modulation device 190, in accordance with some embodiments. Light modulation device 190 includes a pair of conductive elements 130A, 130B formed interior to the device and adjacent to soft dielectric layers 120A, 120B. When a voltage is applied to the conductive elements 130A, 130B, soft dielectric layers 120A, 120B deform to alter the transmission of light through the device, as described above. Light modulation device 190 further includes stiff dielectric layer 110 formed between soft dielectric layers 120A, 120B. Light modulation device 190 further includes another pair of dielectric layers 140A, 140B formed adjacent to conductive elements 130A, 130B. Dielectric layers 140A, 140B have a different refractive index than soft dielectric layers 120A, 120B. Examples of dielectric layers 140A, 140B include, but are not limited to, air, Argon gas, silicone oil, fluorinated polymer fluid, silicone gels, and silicone elastomers. Light modulation device 200 further comprises protection layers 150A, 150B formed adjacent to dielectric layers 140A, 140B. Protection layers 150A, 150B may comprise any suitable transparent material including, but not limited to, glass, and hard plastic.

Figure 2B:
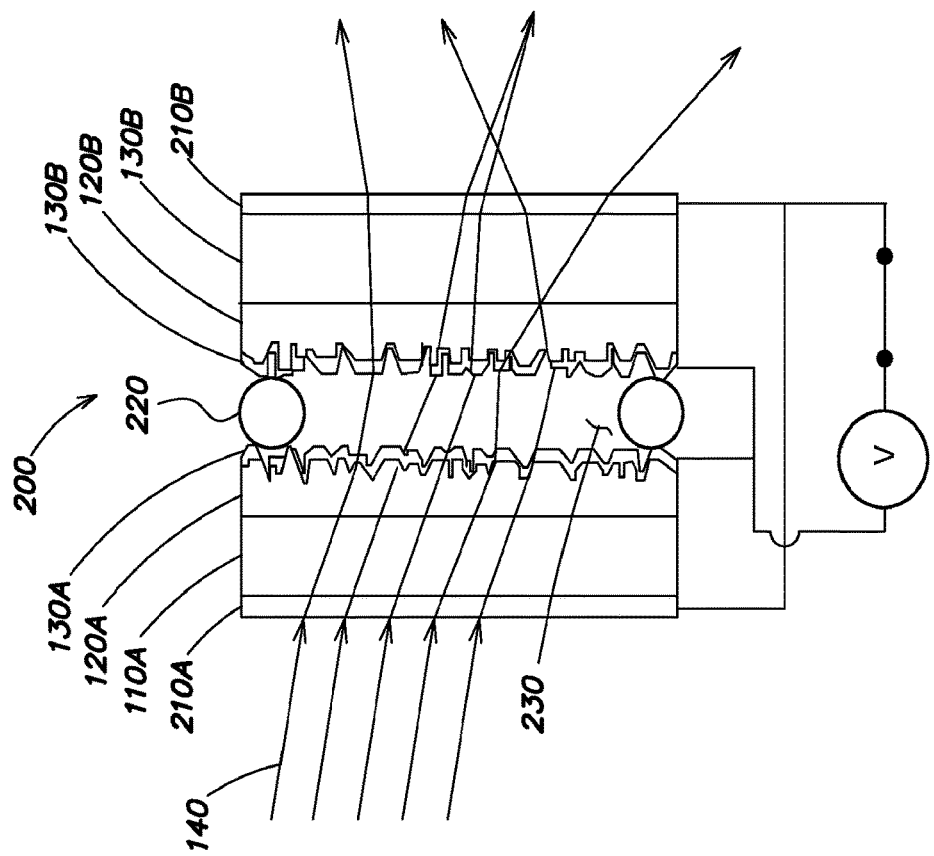
FIG. 2B illustrates a schematic of the light modulation device shown in FIG. 2A when a voltage is applied across the device.
Figure 2A:
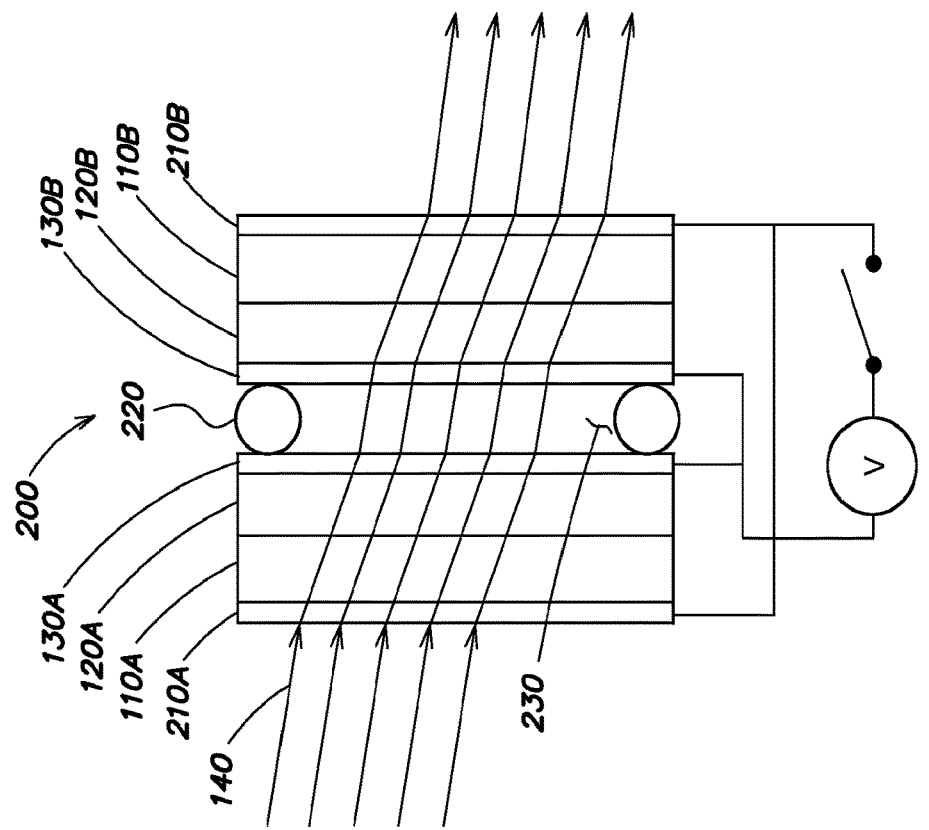
FIG. 2A illustrates a schematic of an alternate light modulation device, in accordance with some embodiments, in the absence of a voltage across the device.

FIG. 2A schematically illustrates an alternate design of a light modulation device 200 in accordance with some embodiments. Light modulation device 200 includes the pair of conductive elements 130A, 130B formed on the interior of the device to reduce the effect of wear and abrasion on the conductive elements. As shown, conductive elements 130A, 130B are formed adjacent to an interior surface of soft dielectric layers 120A, 120B. Soft dielectric layers 120A, 120B are coupled to stiff dielectric layers 110A, 110B. Light modulation device 200 also includes transparent electrodes 210A, 210B coupled to an outside surface of stiff dielectric layers 110A, 110B. Light modulation device 200 also includes spacers 220 arranged between the left half and the right half of the light modulation device to provide separation between the layers of conductive elements 130A, 130B. Although spherical spacers are shown, it should be appreciated that spacers 220 may be any shape, and any number of spacers (including a single spacer) may alternatively be used to provide separation between the layers of conductive elements.

Light modulation device 200 also includes fluid 230 that fills the spaces between spacers 220 and adjacent soft dielectrics 130A and 130B. Fluid 230 may include a gas, a fluid, a dielectric gel, or any combination thereof. In some embodiments, fluid 230 may be implemented as another soft dielectric, provided that the refractive index of fluid 230 is different than that of soft dielectrics 130A, 130B. Examples of fluid 230 include, but are not limited to, air, Argon gas, silicone oil, fluorinated polymer fluid, silicone gels, and silicone elastomers.

As shown in FIG. 2A, in the absence of a voltage applied across the pair of conductive elements 130A, 130B, light 140 entering the device is transmitted though the device. FIG. 2B schematically illustrates light modulation device 200, when a voltage is applied across the device. As shown, the presence of the generated electric field compresses the stiff conductive elements 130A, 130B into soft dielectric layers 120A, 120B to alter the surface morphology of the soft dielectric layers, as discussed above in connection with FIG. 1B. Incident light 140 entering the device 200 interacts with the rough interior surface of the soft dielectric layers causing the light to scatter in different directions, thereby diffusing the light as it passes through the device.

In one implementation, polyacrylic elastomer membranes (3M VHB F9460PC, nominal thickness 50 µm), used as soft dielectrics 120A, 120B, were biaxially pre-stretched to 300% linear strain to a final thickness of 3.1 µm. Silver nanowire mats, used as conductive elements 130A, 130B, were prepared via filtering and transferred to the surface of the elastomer membrane. Actuation of the conductive elements was achieved by applying a DC voltage from 0 to 3 kV from a power source (TREK 610E). The changes in surface morphology of the soft dielectric were captured using optical imaging and 3D surface mapping using a confocal microscope (Olympus LEXT) with a 405 nm laser wavelength, as discussed in further detail below. Optical transmittance was measured using an ocean optics spectrometer with a halogen light source, and a pair of collimators was used to direct the light entering and exiting the device.

In some embodiments, examples of which are described above, deformations in the surface of a soft dielectric material result from the application of a voltage across opposed pairs of compliant conductive electrodes such as meshes of nanowires or carbon nanotubes. In other embodiments, the stiffness and/or the thickness of the soft elastomer layer may be selected such that the Maxwell stress from an applied electrical field induces an electromechanical instability, in the form of 'pits' and/or 'creases' in the surface of the elastomer that scatters light. In such embodiments, a single compliant electrode may be relatively smooth, examples of which include, but are not limited to, an array of electrically percolating carbon nanotubes (CNT) and an ionic conducting liquid. The critical electric field, $E_c$, at which the instability occurs is related to stiffness, $\mu$, and permittivity, $\varepsilon$, of the soft elastomer according to the following equation:

$$E_c \supset \sqrt{\mu/\varepsilon}.$$

While the permittivity of elastomers and polymers is typically limited to a narrow range of values, the stiffness may be greatly varied by several orders of magnitude depending on the particular material and its processing. Consequently, choosing low stiffness elastomers considerably decreases the critical field for instability, below the electric breakdown field. Furthermore, the average spacing of the features is proportional to the thickness of the soft elastomer. Using a thick soft elastomer layer enables visualization of the instability using an optical microscope at a relatively low magnification.

Figure 3B:
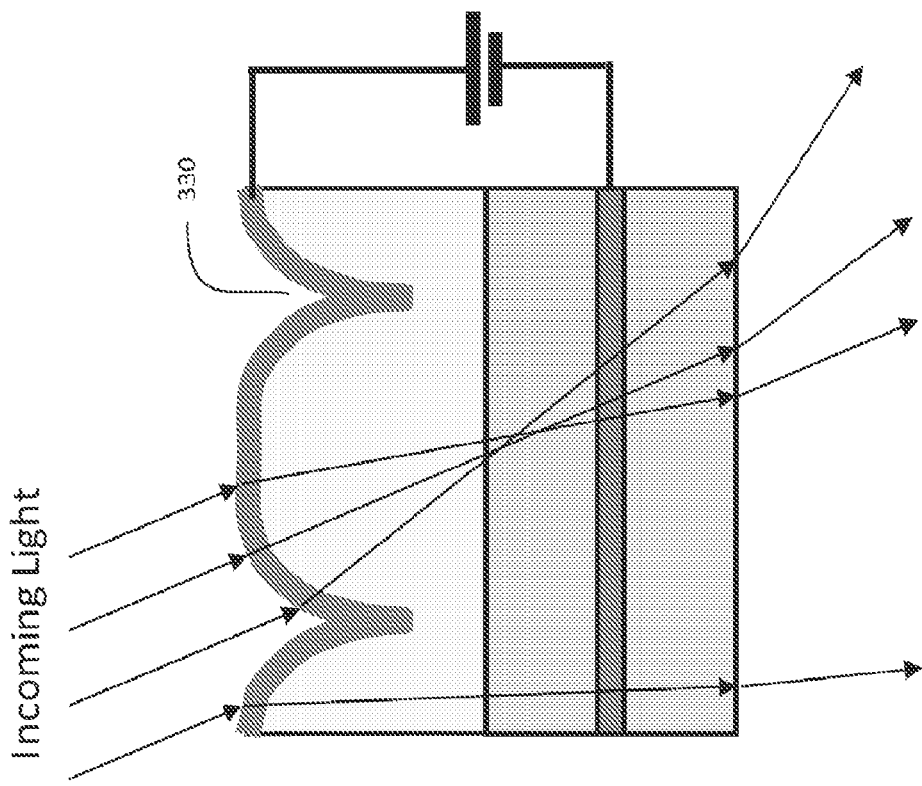
FIG. 3B illustrates a schematic of the light modulation device shown in FIG. 3A when a voltage is applied across the device.
Figure 3A:
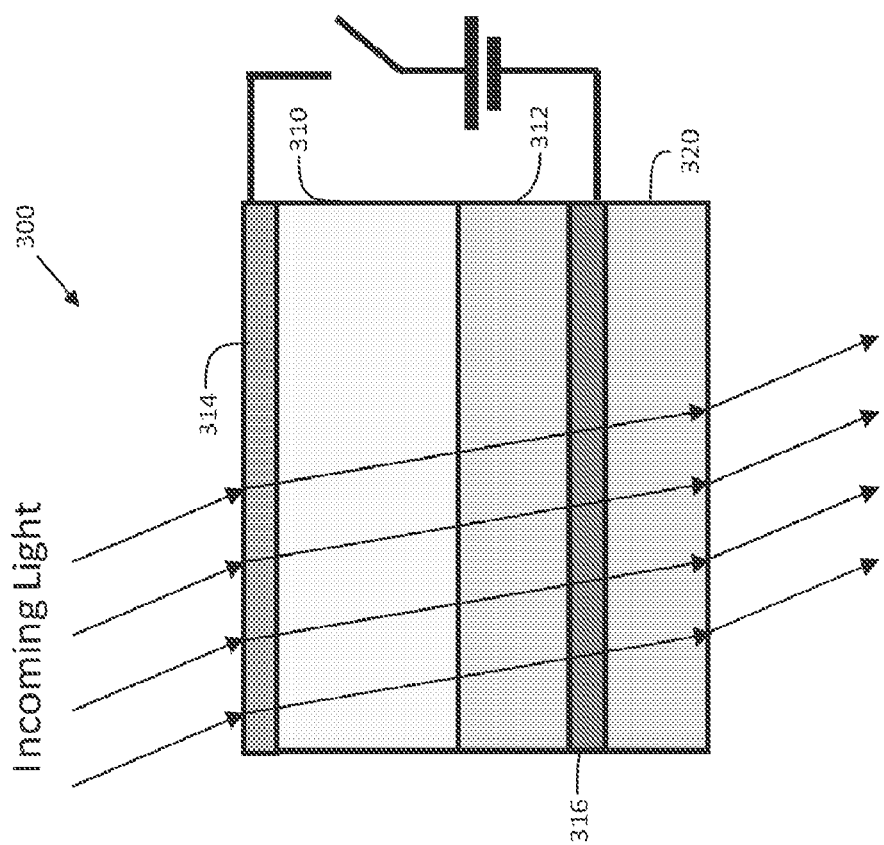
FIG. 3A illustrates a schematic of an alternate light modulation device, in accordance with some embodiments, in the absence of a voltage across the device.

FIG. 3A schematically illustrates an alternate design of a light modulation device 300 in accordance with some embodiments. Light modulation device 300 includes a multi-layer elastomer structure including a soft elastomer layer 310 having a thickness $H_1$ and a stiff elastomer layer 312 having a thickness $H_2$. A compliant conductive element 314 is formed on the surface of the soft elastomer layer 310. Examples of the compliant conductive element 314 include, but are not limited to, a network of carbon nanotubes or silver nanowires. The stiff elastomer layer 312 of the multi-layer elastomer is arranged adjacent to (e.g., deposited on) a stiff dielectric layer 320, examples of which include, but are not limited to, a glass or plastic substrate. The stiff dielectric layer 320 is coated with a thin conducting layer 316 configured to function as an electrode. In some embodiments, the thin conducting layer 316 may be a conductive oxide (e.g., indium tin oxide (ITO)). In other embodiments, the thin conducting layer 316 may be a thin metal (e.g., silver) layer. The stiff dielectric layer 320 provides both structural rigidity and also serves as a substrate for the thin conducting layer 316 deposited thereon.

In some embodiments the soft elastomer layer 310 and the stiff elastomer layer 312 may be made from the same elastomer (e.g., polydimethyl siloxane, PDMS (Sylgard 184, Dow Corning Corp.)), but using a different ratio of the base elastomer and the cross linker elastomer (e.g., to 100:2 and 10:1, for the base and soft elastomer layers, respectively). Use of the same elastomer reduces undesirable light scattering from the interface between the two elastomer layers. When the shear modulus of these elastomer layer compositions differs significantly (e.g. by multiple orders of magnitude), the majority of the electrically-induced deformation occurs within the soft layer when a voltage is applied between the compliant electrode 314 and thin conducting layer 316, as shown.

In the absence of an applied voltage the transmittance of the multi-layer structure is high and objects may clearly be seen through the device. When a voltage is applied across the electrodes, the transmittance through the device decreases with increasing applied voltage. At sufficiently-high applied voltages, the decrease in transmittance is caused by pits 330 that form on the surface of the soft elastomer 310, as shown in FIG. 3B.

Figure 3D:
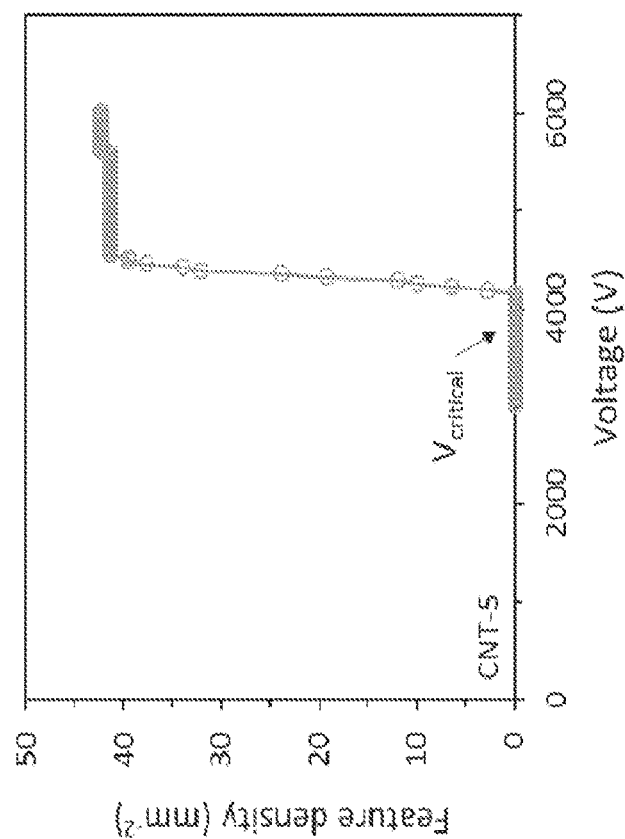
FIG. 3D illustrates a plot showing that the pit density of the light modulation device shown in FIG. 3A increases with applied voltage.
Figure 3C:
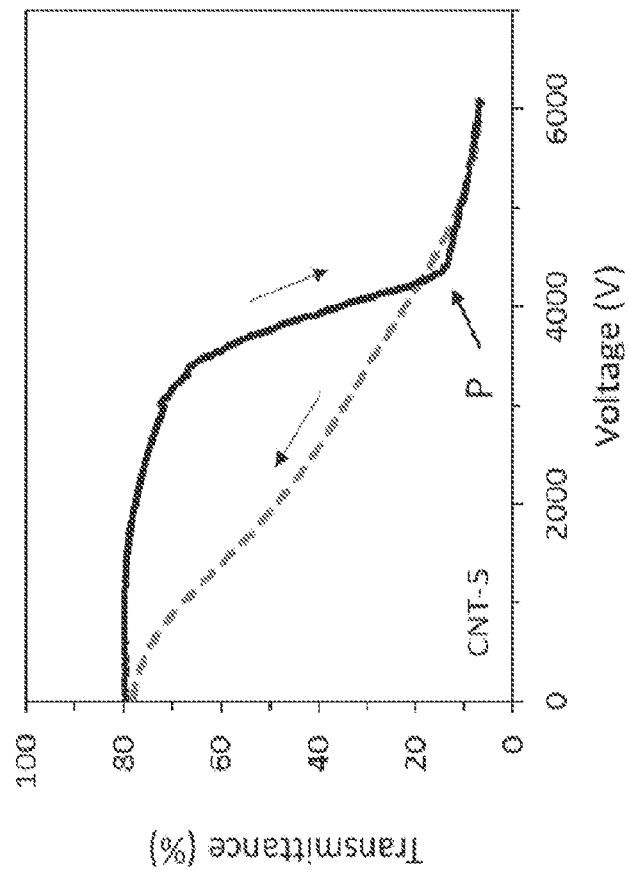
FIG. 3C illustrates a plot showing that the optical transmittance of the light modulation device shown in FIG. 3A is tunable as a function of applied voltage.

FIG. 3C shows that the transmittance through the device may be tuned continuously between maximum and minimum transmittance values by varying the applied voltage. As shown, the in-line optical transmittance through the device shows a monotonic transition from clear to opaque as a function of voltage. The curve has hysteresis which is related to the pitting formation. FIG. 3D shows that the density of the pits 330 formed in the surface of the soft dielectric layer 310 varies as a function of applied voltage. Further information from experiments performed using the device 300 shown in FIG. 3A are described in more detail below in connection with FIGS. 9-12.

Figure 4A:
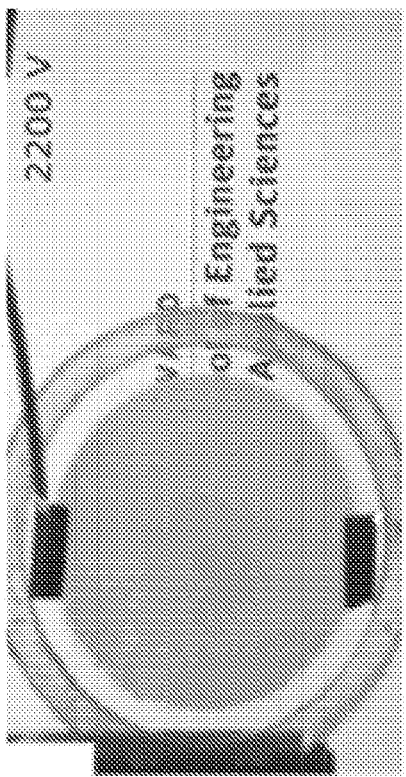
FIGS. 4A and 4B illustrate photographs of a demonstration, in which a voltage is absent or applied to a light modulation device, respectively, in accordance with some embodiments.
Figure 4B:
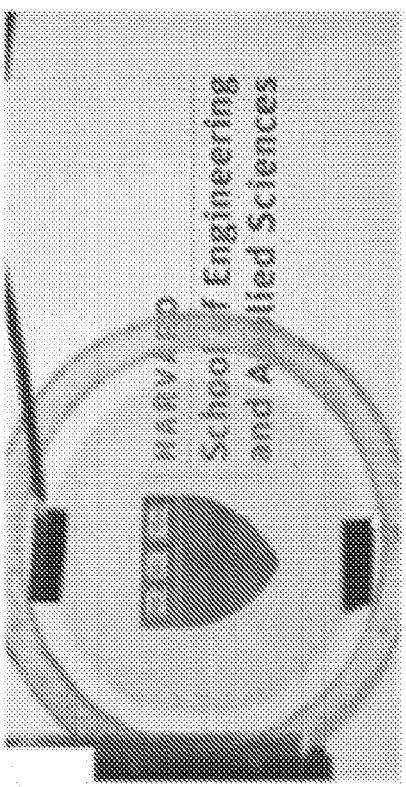

FIGS. 4A and 4B illustrate photographs of results of an experiment, in which a voltage was absent or applied to a light modulation device designed in accordance with the techniques described herein. Application of a voltage across the device resulted in direct light transmission of less than 5% such that letters placed behind the light modulation device, which were visible in the absence of an applied voltage (FIG. 4A), were obscured when the light modulation device was actuated (FIG. 4B).

As discussed above, applying a voltage across the device results in electrical charges on the conductive elements creating an electrical field that induces an attractive force between opposing electrodes in the pair. This compressive force over a unit area, also known as Maxwell stress, depends on the permittivity of the dielectrics, ε, and the magnitude of field, E, as shown by equation: $\sigma = \varepsilon E^2$. Since the soft dielectric is constrained in the lateral direction, the force effectively presses the conductive elements into the dielectric, creating deformation in the form of undulation (e.g., bulges and depressions) on the surface of the soft dielectric. Such undulation scatters incoming light and reduces direct light transmission. The density of conductive elements on the surface of the soft dielectric determines the average spacing of the individual elements. When the spacing is small (e.g., below the resolving power of the human eyes or digital camera), the letters behind the light modulation device appear diffuse when a voltage is applied.

Figure 5B:
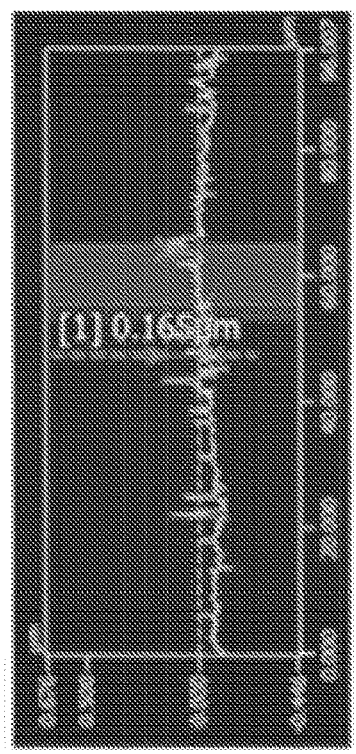
FIG. 5B illustrates a quantitative line scan showing that nanowires in the light modulation device of FIG. 5A have a small displacement when the voltage is absent.
Figure 5D:
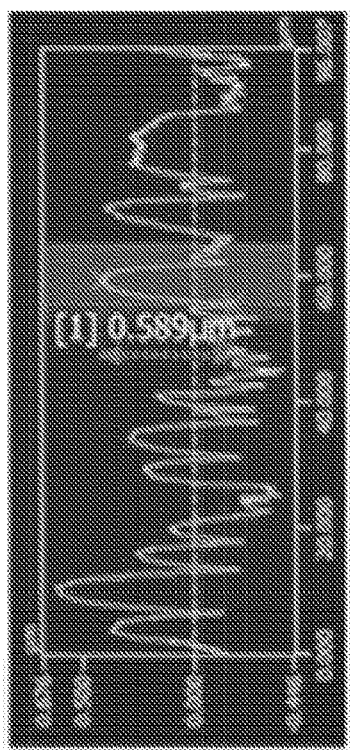
FIG. 5D illustrates a quantitative line scan showing that nanowires in the light modulation device of FIG. 5C have a large displacement when a voltage is applied.
Figure 5A:
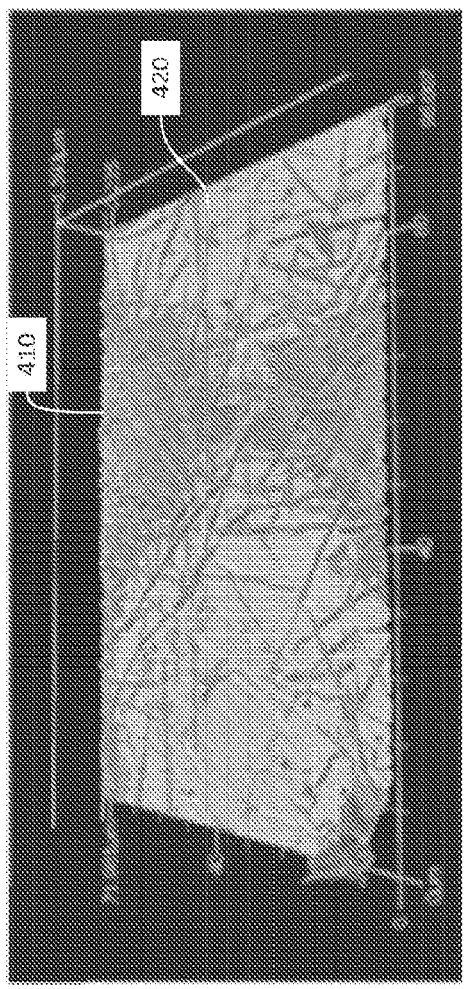
FIG. 5A illustrates a confocal microscopy image of a light modulation device, in accordance with some embodiments, in the absence of a voltage applied to the device.

The change of surface morphology of the soft dielectric layer(s) of the light modulation device before and after the application of voltage is revealed by optical microscopy as shown in FIGS. 5A-5D. FIG. 5A shows an initial state prior to application of a voltage, in which the conductive elements (e.g., silver nanowires) 410 remain flat on the elastomer surface 420 and the only contribution to the roughness of the surface originates from the geometry of the conductive elements. The quantitative surface profile shown in FIG. 5B indicates peaks in the range of 80 to 170 nm, which correspond to the thickness of single and double (stacked) conductive elements.

Figure 5C:
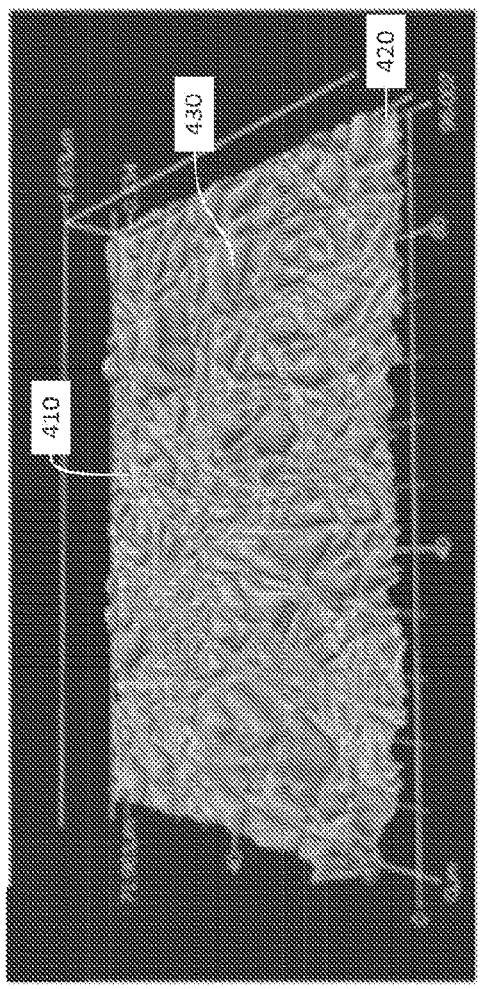
FIG. 5C illustrates a confocal microscopy image of the light modulation device of FIG. 5A when a voltage is applied to the device.

After the application of a 3 kV voltage, the surface morphology of the elastomer changes dramatically, as shown in FIG. 5C. Due to the relative stiffness of the conductive elements 410 compared to the elastomer surface 420, bumps 430 and valleys form across the surface when the voltage is applied. The sharp valleys correspond to the location and size of the conductive elements (e.g., the nanowires) while the bumps correspond to the empty spaces between the conductive elements where the soft dielectric bulges outward. The quantitative surface profile shown in FIG. 5D illustrates a peak-to-valley distance of more than 600 nm indicating that the conductive elements are vertically displaced at multiple times their diameter. The magnitude of the vertical displacement depends on the spacing between adjacent conductive elements, with close spacing or highly-dense conductive elements producing relatively small vertical displacement.

Figure 6B:
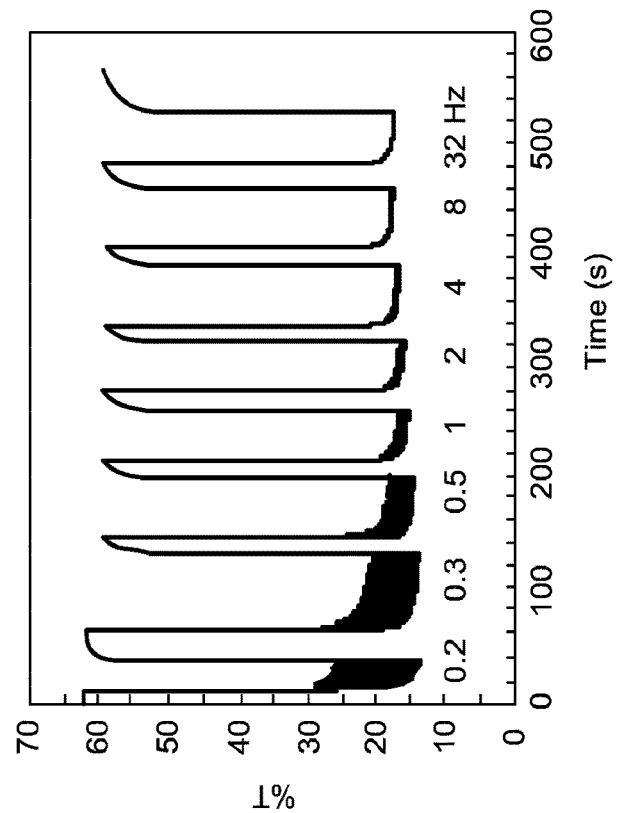
FIG. 6B illustrates a plot showing light transmittance of a light modulation device, in accordance with some embodiments, when a constant peak-to-peak AC voltage is applied to the device.
Figure 6A:
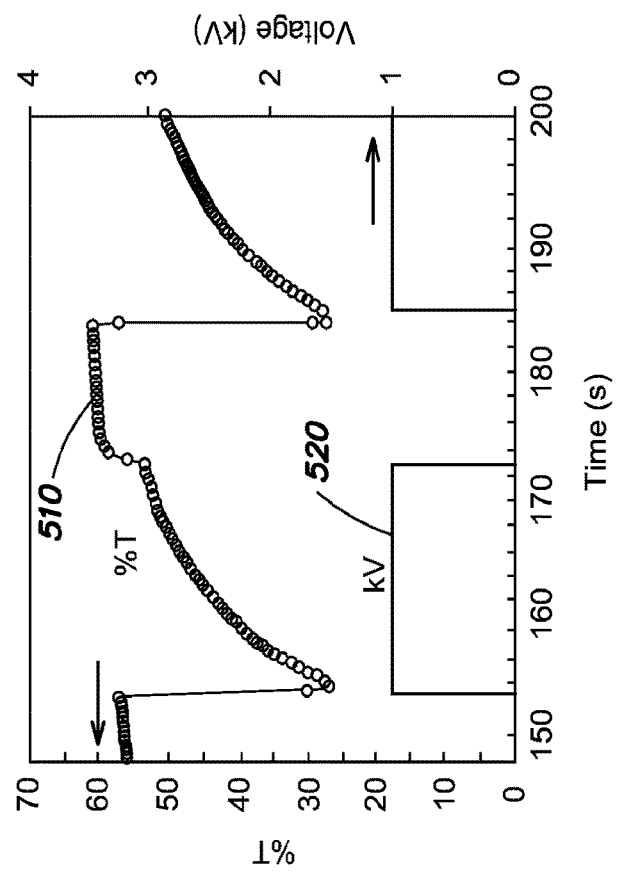
FIG. 6A illustrates a plot showing that when voltage is applied to a light modulation device, in accordance with some embodiments, the light transmittance of the device decreases.

FIG. 6A is a plot describing how light transmittance 510 through a light modulation device designed in accordance with some embodiments, decreases in response to application of a voltage 520. As shown, when a 1 kV voltage is applied, light transmittance 510 decreases substantially within one second. When the voltage is held constant, the transmittance increases monotonically. The change in transmittance at a constant actuation voltage indicates a drift in the surface morphology of the electrodes.

FIG. 6B is a plot describing how light transmittance changes when a constant peak-to-peak AC voltage is applied at different frequencies. The drift in surface morphology can be reduced by using an AC voltage source in which the polarity of the conductive elements is periodically altered. As shown, when an AC signal at or above 2 Hz is used, the drift in surface morphology may be substantially suppressed, resulting in a relatively smooth change in transmittance.

Figure 7B:
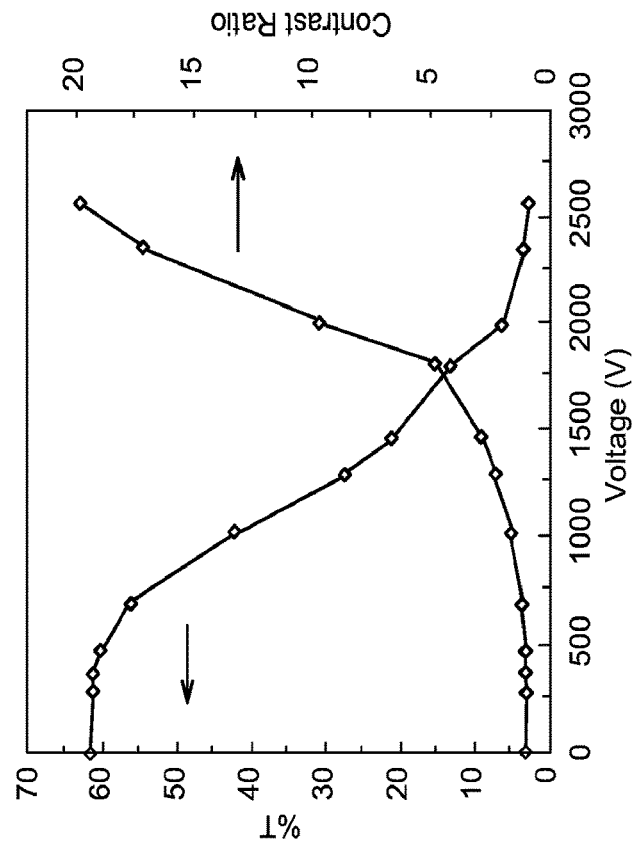
FIG. 7B illustrates a plot showing that the optical transmittance and corresponding contrast ratio of a light modulation device designed in accordance with some embodiments, is tunable as a function of electrical voltage.
Figure 7A:
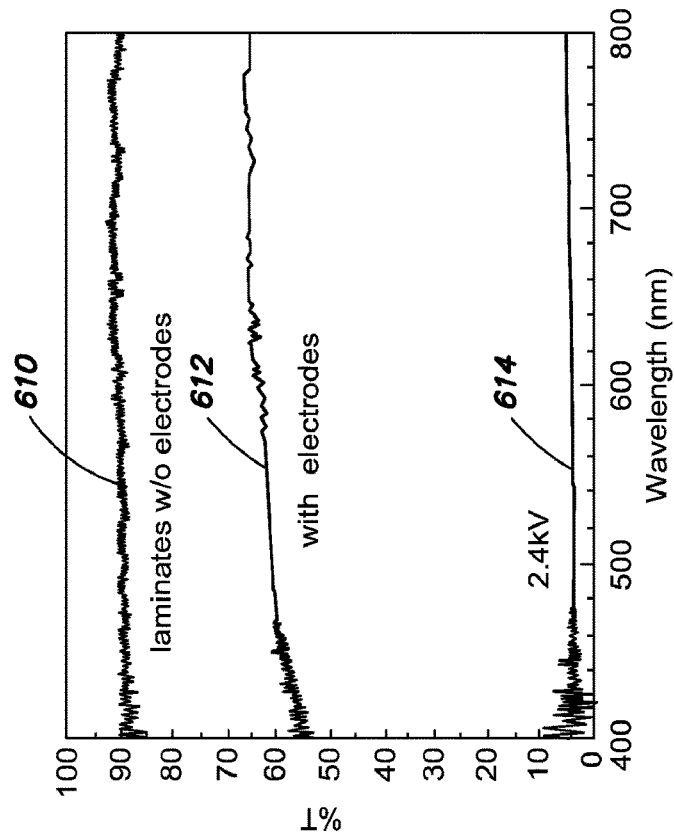
FIG. 7A illustrates a plot showing a decrease in optical transmittance of a light modulation device, in accordance with some embodiments, with and without the use of electrodes and when a voltage is applied to the device.

FIGS. 7A and 7B illustrate the change in the optical transmittance of a light modulation device designed in accordance with the techniques described herein, as a function of actuation voltage. When no conductive elements are present on the surface of the soft dielectric layers (trace 610), the three dielectric layer laminate has transmittance of 90%, where most of the light lost is attributed to the surface reflectance at the interface between the soft dielectric (elastomer) layers and the air. Introduction of the conductive elements (e.g., silver nanowires) onto the surface of the soft dielectric layers at a density of 78 mg/m$^2$ (trace 612), results in a decrease in the transmittance to 62% at a measurement wavelength of 550 nm. This transmittance is still higher than the maximum transmittance obtainable using a polarizer (i.e., 50%). The light transmission of the conductive elements depends on the density of the elements in the mesh, which can be controlled during fabrication. Furthermore, it is possible to improve the initial transmittance using conductive elements with a small diameter but high aspect ratio, which reduces the haze and the critical percolation threshold for electrical conductivity. It should also be possible to improve the transmittance based on the use of certain types of conductive elements (e.g., gold-coated silver nanowires), which exhibit high resistance to degradation or weathering and exhibit lower haze.

As shown by trace 614, after the application of the electric field to the light modulation device, the light transmission drops substantially—down to 3% transmittance using a 2.4 kV actuation voltage. The device is color neutral because the shape of the spectra are relatively flat and the shape does not change with actuation. Between the extreme values (e.g., 3% and 62%), the transmittance can be tuned continuously by controlling the actuation voltage, as shown in FIG. 7B. The transmittance curve has a non-linear shape, in particular near the low and high limits. The nonlinearity at the low-end limit is caused by the quadratic dependence of the Maxwell force on the electric field, whereas the nonlinearity at the high-end limit is caused by the highly diffuse scattering that allows some light to enter the detector by multiple scattering.

Figure 8:
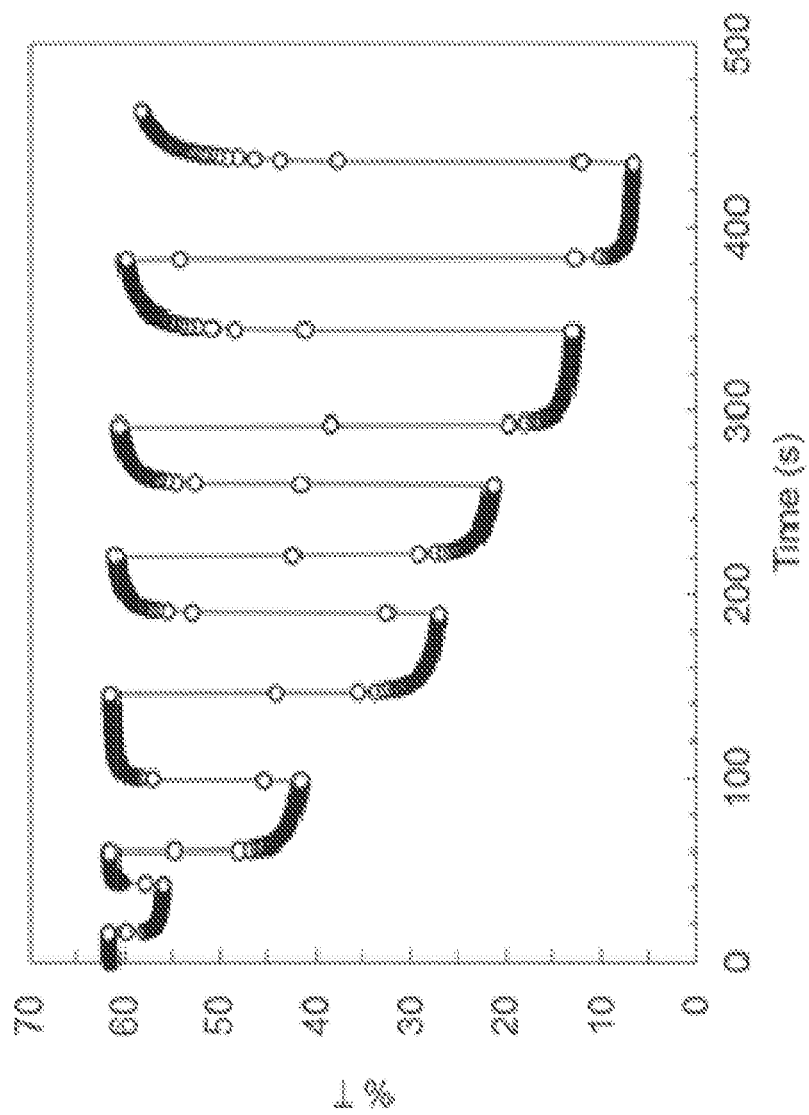
FIG. 8 illustrates that the transmittance of a light modulation device, in accordance with some embodiments, changes as a function of time.

FIG. 8 shows the change of light transmittance (at 550 nm optical wavelength) through a light modulation device in accordance with some embodiments, as a function of time. The actuation voltages used were square signals at increasing voltage. As shown, the response shape is characterized by a fast initial response of about one second followed by a slow response in both the on and off direction.

FIGS. 9A-9D illustrate in-situ bright field optical microscope images showing changes in the soft elastomer surface as a function of applied voltage for an illustrative device designed in accordance with the schematic of FIG. 3A. The areal density of the carbon nanotube mesh electrode used to create the images in FIGS. 9A-9D was 8.3 mg/m$^2$. The scale bar shown in FIG. 9A is 200 µm. As shown in FIG. 9A, before the application of any voltage, the surface of the soft elastomer surface was featureless except for an occasional defect. As shown in FIG. 9B, when the applied voltage is approximately 3000 V, a low areal density of darker, circular features were formed with dark specks in their vicinity and with an apparent small crease. As observed from the transmittance curve of FIG. 3C, the transmittance at this applied voltage is approximately half compared to when no voltage was applied. As shown in FIG. 9C, when a higher voltage of 3800 V was applied, multiple distinct circular features formed, corresponding to the pits 330 described above. FIG. 9D shows that further increases in the applied voltage up to 5300 V resulted in the number density of the pits increasing. The optical size of the pits also grew with applied voltage while maintaining an approximately circular outline until at the highest voltages, they impinged and their outlines became more irregular, as shown in FIG. 9D. When the applied voltage was subsequently decreased, the number density of pits decreased until none were visible. The variation in transmittance was relatively small until a threshold voltage was reached at around 2 kV, significantly below the voltage at which the transition to the formation of pits occurred.

The detailed shape of the pits can be established from optical microscope contrast, confocal microscopy, and from interferometric microscopy but is limited by the steep shapes of the pits. Nevertheless, it appeared from the optical images that the pits extended down through the soft elastomer to the interface with the stiffer layer at the higher voltages as there were optical caustics at the bottom of the pits, which were not visible in the image recorded at 3800 V (FIG. 9C).

FIGS. 10A-10D illustrate confocal microscopy images that show changes to the surface of the soft dielectric layer 310 at different applied voltages for an experiment in which the multi-layer elastomer had a thickness of 200 µm. FIG. 10A shows that in the absence of an applied voltage, the elastomer surface showed oval features, which were plastic deformations that appeared more clearly after the first formation of the pit. Although the depth of the features is on the order of hundreds of nanometers, the overall elastomer surface is still relatively flat. With the application of an electric field, the morphology of the elastomer surface changes continuously, producing deep depressions at the pit and bulges between the pits.

FIG. 10D shows a 2D plot of a sample height map where the dark areas indicate low elevation. The white areas, an example of which is indicated by the arrow in FIG. 10D, were artifacts of the imaging process. FIG. 10E shows a height plot along the line shown in FIG. 10D at different applied voltages.

FIG. 10F shows the peak-to-valley depth, d, plotted together with the in-line transmittance as a function of voltage. As shown, the maximum peak-to-valley displacement was on the order of 20 µm at an applied voltage 6 kV. Since the spacing between the pits was similar, the magnitude of the surface displacements was quite uniform. However, when the variance in the distance between the pits and the orientation of the pits was random, the light scattering did not produce a distinct interference pattern.

Figure 11A:
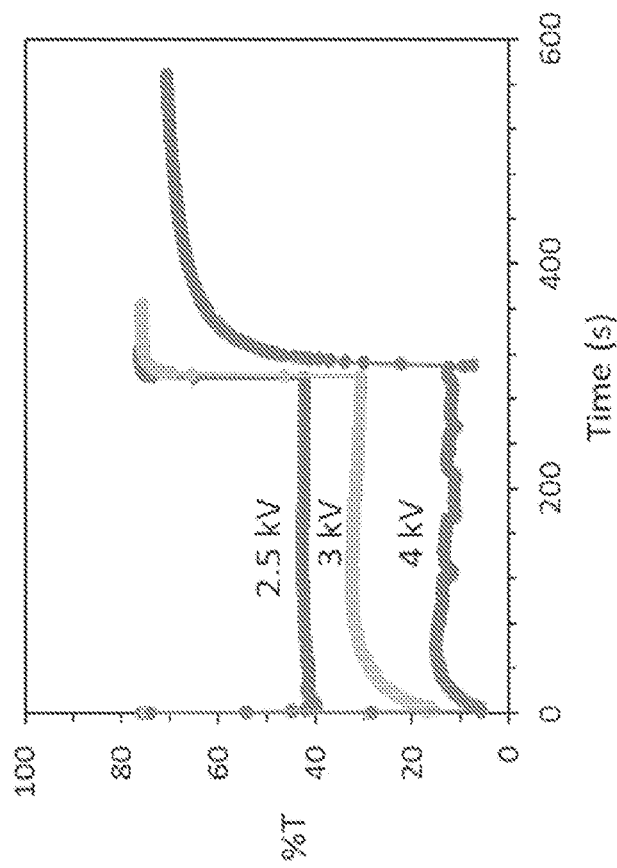
FIG. 11A illustrates a plot showing that haze increases as function of voltage for two different electrode types used in accordance with the light modulation device shown in FIG. 3A.

Complementary information about the light scattering comes from the variation in optical haze as a function of applied voltage, as shown in FIG. 11A. In the absence of any voltage, the haze depends on the density of carbon nanotubes or nanowires used to form the compliant conductive electrode 314 as well as the surface roughness. For the electrode used for the transmittance measurements in FIG. 3C (CNT-10), the intrinsic haze was 2.5% and did not significantly change until a voltage of 1500 V was applied. Thereafter, the haze increased approximately as the square root of the applied voltage. Similar behavior was observed when a higher CNT density (CNT-50) electrode was used; the intrinsic haze was considerably higher, but the applied voltage dependence was similar. The haze was controlled by the surface morphology, particularly the micro- and nanostructures of the CNT electrode mat. The onset of the voltage dependent increase in haze occurred at approximately the same voltage as the transmittance began to decrease and well before the pits begin to form.

Before the pits are formed, the surface of the elastomer may already be deformed by the CNT electrode, which is similar to the deformation caused by metallic nanowires under high voltage. In this case, however, the size of the carbon nanotubes is significantly smaller than nanowires such that the resulting elastomer deformation is small, resulting in contour deformation that cannot be resolved by the power of an optical microscope. Nevertheless, the overall effect of such deformation can be observed in the slightly darkening in elastomer surface as shown in FIG. 9A, as discussed above. After the pits formed and relatively stabilized in number, the pits grew in size at increasing applied voltages. This indicated that the extent of deformation also increased and consequently increased the scattering power of the elastomer, as observed by the decrease in the optical transmittance at higher applied voltages.

Figure 11B:
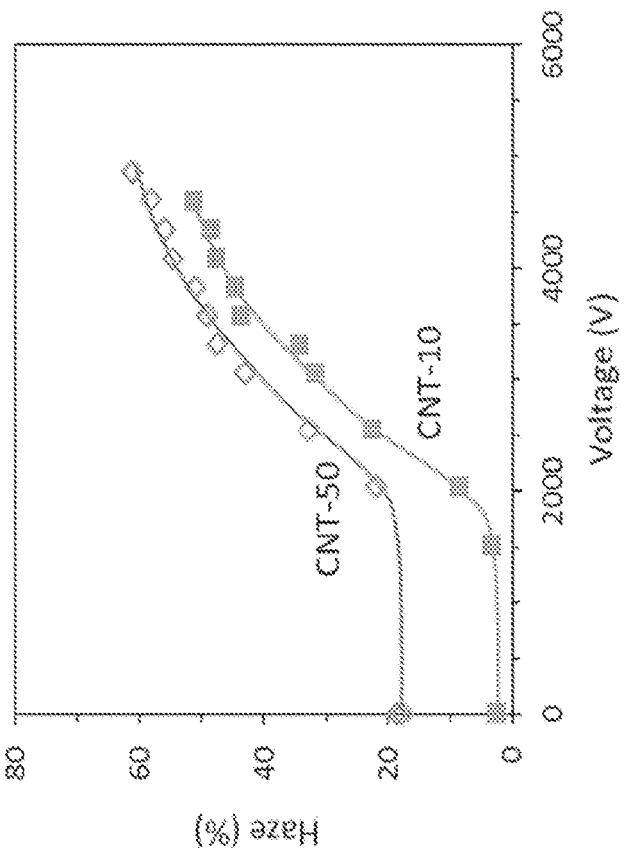
FIG. 11B illustrates a plot showing that time dependence of optical transmittance through the light modulation device shown in FIG. 3A changes as a function of applied voltage.

FIG. 11B shows that the transmittance through a light modulation device designed in accordance with the schematic of FIG. 3A rapidly dropped when a constant voltage was applied instantaneously, typically in less than two seconds, for the three illustrated applied voltages. After the initial response, the transmittance increased slightly for about 60 seconds before stabilizing. This slow increase was attributed to viscoelastic relaxation of the elastomer. The ability to maintain transmittance at a constant applied voltage consumes less power and requires relatively simple circuitry compared to devices that employ an AC electric field. As shown, when the applied constant voltage was turned off, the transmittance increased rapidly at first and then approached the zero voltage value. The response time from the opaque state to the transparent state depended on the initially-applied constant voltage, and was noticeably longer from the pitted state compared to when fewer or no pits were formed. While the fast change upon application of a constant voltage was attributed to spontaneous action of the electrostatic stress, the inertia and viscoelasticity of the elastomer slowed down the response time when transitioning from an opaque state to a transparent state when the applied voltage was removed.

Figure 12B:
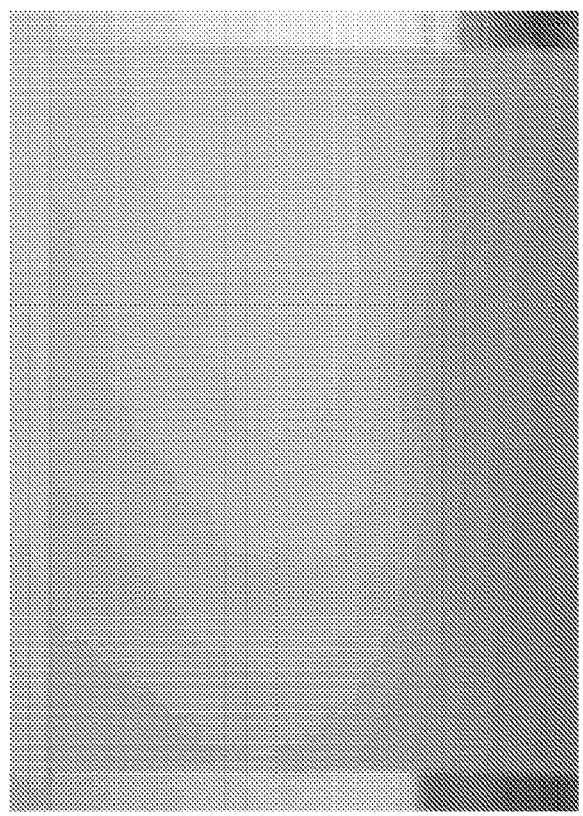
FIGS. 12A and 12B illustrate a privacy window that incorporates the light modulation device shown in FIG. 3A without an applied voltage, and when a voltage is applied, respectively.
Figure 12A:
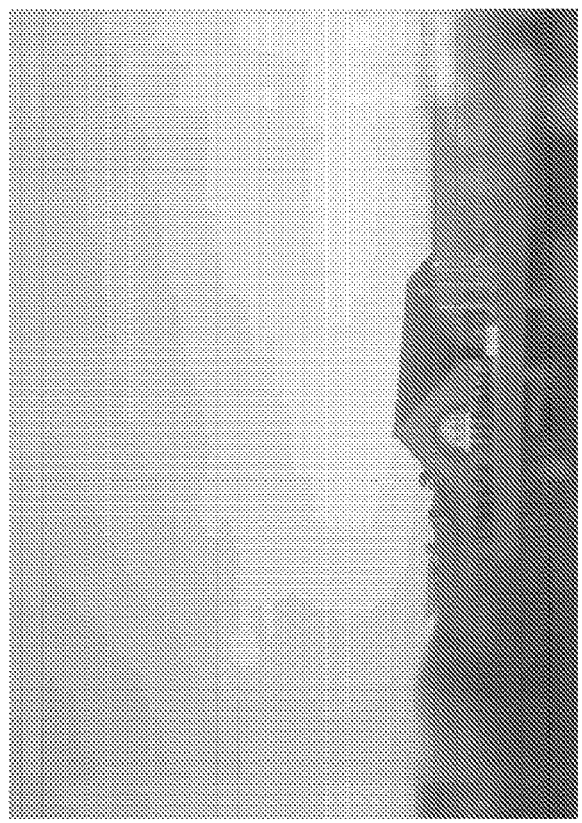

FIGS. 12A and 12B show a demonstration of light scattering for a multi-layer light modulation device implemented as a privacy window. The change in the haziness of objects viewed through a multi-layer device, is shown. FIG. 12A shows that in the absence of an applied voltage, the elastomer sheet was highly transparent and the objects, including a building and clouds, were clearly seen through the device. FIG. 12B shows that when a 4.5 kV voltage was applied to the device, objects could no longer be clearly seen through the device. Upon removal of the applied voltage, the transparency of the device returned to its initial state. The transition to the hazy or opaque state occurred relatively quickly (e.g., in less than two seconds), however the return transition to a transparent state occurred at slower rate (e.g., approximately one minute). The switching speed of the transition may have been affected by several factors, including the resistance of the electrodes, overall capacitance of the device, and viscoelasticity of the elastomer.

Figure 13B:
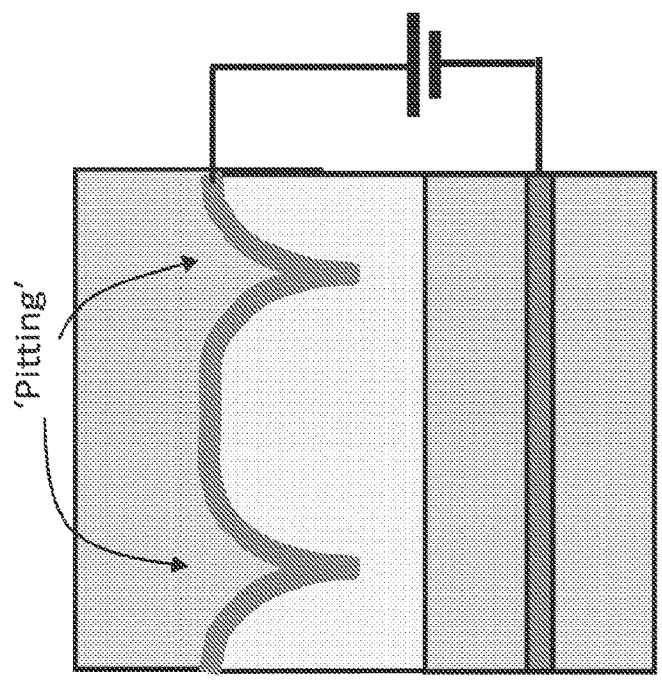
FIG. 13B illustrates a schematic of the light modulation device shown in FIG. 13A when a voltage is applied across the device.
Figure 13A:
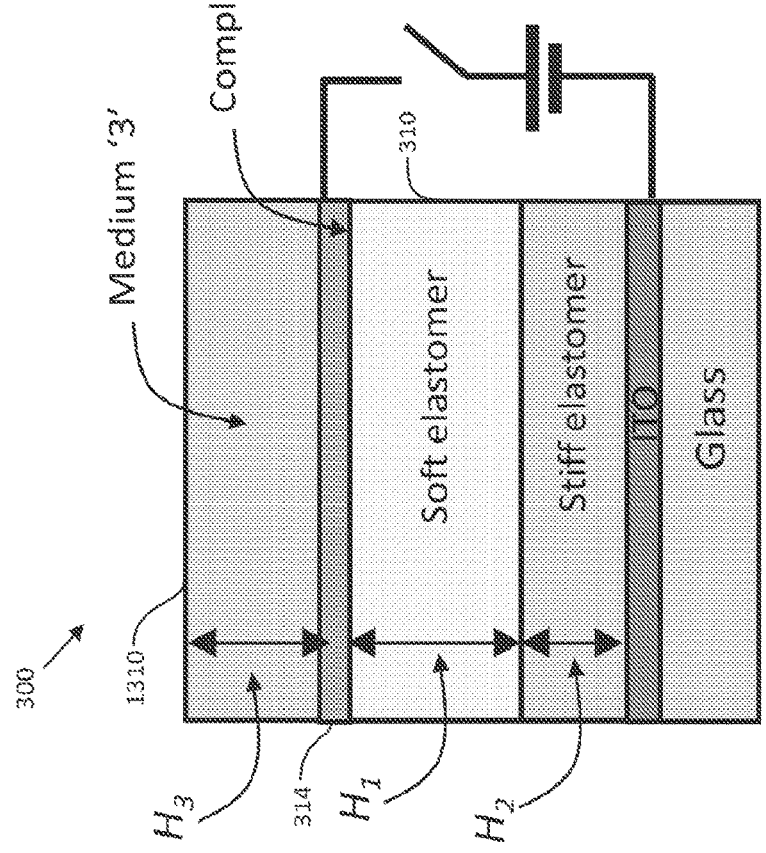
FIG. 13A illustrates a schematic of an alternate light modulation device, in accordance with some embodiments, in the absence of a voltage across the device.

FIG. 13A schematically illustrates a modified design of a light modulation device shown in FIG. 3A in accordance with some embodiments. The light modulation device includes an additional soft matter layer 1310 having a thickness $H_3$, formed adjacent to the compliant conductive electrode 314. Soft matter layer 1310 may comprise soft matter including, but not limited to, a gel or fluid. When soft layer 1310 is electrically conductive, such as an ionic conductor, compliant conductive electrode 314 may not be needed. Soft matter layer may have a different index of refraction compared to the soft elastomer layer 310, with the difference in the index of refraction enabling light scattering at the interface when deformation of the soft elastomer layer 310 surface occurs in response to an applied voltage, as shown in FIG. 13B.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The invention claimed is:

1. A light modulation device, comprising:
   a transparent laminate structure including at least one soft dielectric layer and at least one stiff dielectric layer having a stiffness greater than the stiffness of the at least one soft dielectric layer; and
   a plurality of stiff conductive elements formed on a surface of the at least one soft dielectric layer that, in the presence of an electric field, compress the at least one soft dielectric layer to produce non-uniform deformation of the surface of the at least one soft dielectric layer on which the plurality of stiff conductive elements are formed, wherein the non-uniform deformation of the surface of the at least one soft dielectric layer is configured to scatter light incident on the transparent laminate structure.

2. The light modulation device of claim 1, wherein the at least one soft dielectric layer comprises a first soft dielectric layer coupled to a first surface of the at least one stiff dielectric layer and a second soft dielectric layer coupled to a second surface of the at least one stiff dielectric layer.

3. The light modulation device of claim 2, wherein the plurality of stiff conductive elements comprises a first set of stiff conductive elements formed on an outer surface of the first soft dielectric layer and a second set of stiff conductive elements formed on an outer surface of the second soft dielectric layer.

4. The light modulation device of claim 1, wherein the plurality of stiff conductive elements comprises a plurality of metal nanowires.

5. The light modulation device of claim 1, wherein the plurality of stiff conductive elements comprises a plurality of carbon nanotubes.

6. The light modulation device of claim 1, wherein the plurality of stiff conductive elements comprises a mesh of stiff conductive elements having a density that permits a light transmittance of greater than 50% through the light modulation device.

7. The light modulation device of claim 1, wherein the at least one soft dielectric layer comprises a transparent elastomer.

8. The light modulation device of claim 7, wherein the transparent elastomer is selected from the group consisting of silicones, polyacrylates, and polyurethanes.

9. The light modulation device of claim 1, wherein the at least one stiff dielectric layer comprises glass, a transparent polymer, or a transparent oxide.

10. The light modulation device of claim 1, wherein the at least one stiff dielectric layer is coated with a conducting oxide or a thin metal layer.

11. The light modulation device of claim 1, wherein the at least one stiff dielectric layer comprises a first stiff dielectric layer and a second stiff dielectric layer, and wherein the at least one soft dielectric layer comprises a first soft dielectric layer adhered to the first stiff dielectric layer and a second soft dielectric layer adhered to the second stiff dielectric layer.

12. The light modulation device of claim 11, wherein the plurality of stiff conductive elements comprises a first set of stiff conductive elements formed on an inner surface of the first soft dielectric layer and a second set of stiff conductive elements formed on an inner surface of the second soft dielectric layer.

13. The light modulation device of claim 12, further comprising at least one spacer arranged between the first soft dielectric layer and the second soft dielectric layer to provide separation between the first soft dielectric layer and the second soft dielectric layer.

14. The light modulation device of claim 11, further comprising:
   a first transparent electrode adhered to an outer surface of the first stiff dielectric layer and a second transparent electrode adhered to an outer surface of the second stiff dielectric layer.

15. The light modulation device of claim 1, further comprising:
   a voltage source electrically connected to the plurality of stiff conductive elements and configured to generate the electric field.

* * * * *